US009623623B2

(12) United States Patent
Stein et al.

(10) Patent No.: US 9,623,623 B2
(45) Date of Patent: Apr. 18, 2017

(54) THICKNESS CALIBRATION OF AN EMBOSSING DIE

(75) Inventors: Shahar Stein, Petach-Tikva (IL); Eyal Peleg, Zoran (IL); George Trendafilov, Ashdod (IL); Itzik Shaul, Tel Aviv (IL)

(73) Assignee: Hewlett-Packard Indigo B.V., Amstelveen (NL)

( * ) Notice: Subject to any disclaimer, the term of this patent is extended or adjusted under 35 U.S.C. 154(b) by 1260 days.

(21) Appl. No.: 13/593,711

(22) Filed: Aug. 24, 2012

(65) Prior Publication Data

US 2014/0058694 A1 Feb. 27, 2014

(51) Int. Cl.
*B31F 1/07* (2006.01)
*G01C 25/00* (2006.01)

(52) U.S. Cl.
CPC ........ *B31F 1/07* (2013.01); *B31F 2201/0717* (2013.01)

(58) Field of Classification Search
CPC ..... B31F 1/07; B31F 2201/0717; G01C 25/00
See application file for complete search history.

(56) References Cited

U.S. PATENT DOCUMENTS 6,367,385 B2 4/2002 Komori
6,919,113 B2 7/2005 Therrian et al.
2007/0188537 A1 8/2007 Kim et al.
2010/0215865 A1 8/2010 Keoshkerian et al.
2010/0286811 A1* 11/2010 Jones .................... B29C 43/003 700/110
2011/0205568 A1 8/2011 Moalem et al.

OTHER PUBLICATIONS

Andres et al., Inkjet Deposition of Layer by Layer Assembled Films, Oct. 20, 2010, J. Am. Chem. Soc. 132(41), 17 pp.*
Flesch, R. D. et al., "Deducing Ink Thickness Variations by a Spectral Prediction Model," Color Research and Application, vol. 34, No. 6, Dec. 2009, pp. 432-442.

* cited by examiner

*Primary Examiner* — Toan Le
(74) *Attorney, Agent, or Firm* — HP Inc. Patent Department

(57) ABSTRACT

There is disclosed a computer program product for carrying out a method of calibrating a thickness of an embossing die, the embossing die being formed from a plurality of ink layers printed by an apparatus. According to the method, an average thickness of an ink layer printed by the apparatus may be calculated, and a target die thickness may be calculated as a function of the average ink layer thickness. A system for implementing a method of calibrating a thickness of an embossing die and a method of measuring a thickness of an embossing die are also disclosed.

19 Claims, 4 Drawing Sheets

THICKNESS CALIBRATION OF AN EMBOSSING DIE

BACKGROUND

Embossing is a process that may be used to create raised features or areas in paper or other print media. Embossing may be performed as a post printing process on dedicated embossing machinery comprising a die formed in two pieces. A portion of the print media is placed between the two pieces of the die, and is then compressed between the two pieces, thus deforming the print media and forming the embossed image.

BRIEF DESCRIPTION OF THE DRAWINGS

Examples of the invention will be described, by way of non limiting example, with reference to the following drawings, in which.

DETAILED DESCRIPTION

Figure 1:
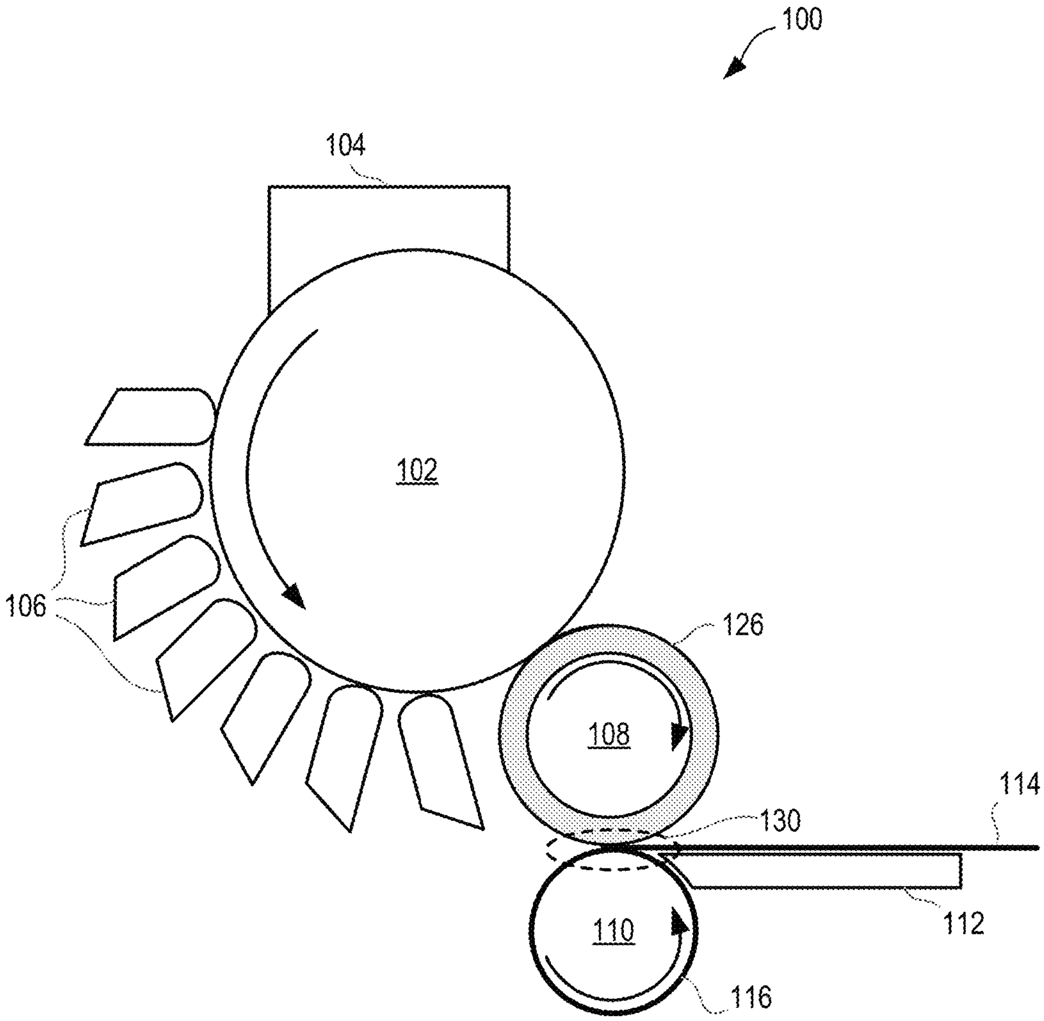
FIG. 1 illustrates an example of a Liquid Electro Photographic (LEP) printing system.

Before the examples of the present invention are disclosed and described, it is to be understood that the examples are not limited to the particular components, process steps and materials disclosed herein because such components, process steps and materials may vary somewhat. It is also to be understood that the terminology used herein is used for the purpose of describing particular examples only. The terms are not intended to be limiting in any way because the scope of the present invention is intended to be limited only by the appended claims and equivalents thereof.

It is noted that, as used in this specification and the appended claims, the singular forms “a,” “an,” and “the” include plural referents unless the context clearly dictates otherwise.

As used herein, the term “about” is used to provide flexibility to a numerical range endpoint by providing that a given value may be a little above or a little below the endpoint. The degree of flexibility of this term can be dictated by the particular variable concerned.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Amounts and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of “about 1 mm to about 5 mm” should be interpreted to include not only the explicitly recited values of about 1 mm to about 5 mm, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any feature described herein can be combined with any aspect or any other feature described herein.

Embossing is a process that may be used to create raised images in paper or other print media. According to this process, the print medium to be embossed is compressed against a die, deforming the medium and so forming the raised, embossed image. Some embossing dies may be formed from brass, bronze or copper and may be individually cast or machined prior to being installed in a dedicated embossing apparatus. Once received from a printing apparatus, a printed medium is then passed through the embossing apparatus for post printing embossing.

An alternative embossing technique as found by the present inventors will now be briefly described. The present disclosure relates to a computer program product and related methods that may be used in the context of the following embossing technique. This embossing technique involves the creation of an embossing die structure formed entirely from an ink layer or layers deposited on a supporting substrate. A print medium is then compressed against the die to be embossed. In some examples, the ink structure that forms the embossing die may be created using a digital printing process, as described below with reference to FIGS. 1 and 2.

It is noted that in the subsequent description, and appended claims, the term “ink” refers broadly to material deposited onto a surface by a printer or press. For example, the term “ink” includes liquid toners, dry toners, UV cured inks, thermally cured inks, inkjet inks, pigment inks, dye based inks, solutions without colorant, solvent based inks, water based inks, plastisols, or other appropriate solutions.

Digital printing technologies suitable for the above discussed digital embossing technique include, inter alia, Liquid Electro Photographic (LEP) printing. LEP printing refers to a process in which an electrostatic charge pattern is generated on a surface, the charge pattern representing an image to be printed. This latent image is then developed by the addition of liquid toner, which is selectively applied through an electric field onto the surface. In most LEP processes, this image is then transferred to at least one intermediate surface, and then to a print medium. During the operation of a digital LEP system, ink images are formed on the surface of a photo-imaging cylinder. These ink images are transferred to a blanket cylinder which may be heated and then to a print medium. The photo-imaging cylinder rotates substantially continuously, passing through various stations to form each image.

In the context of the LEP printing system described, the term “nip” refers to a region between two cylinders where the cylinders are in closest proximity. When a print medium or other sheet material passes through the nip, the distance between the two cylinders can be adjusted to produce differing levels of pressure on the print medium.

FIG. 1 illustrates an example digital LEP system 100. The system comprises a photo-imaging cylinder 102, a latent image forming unit 104, a plurality of Binary Ink Developer (BID) units 106, an Intermediate Transfer Member (ITM) 108, an impression cylinder 110 and a feed tray 112.

To print an image on a print medium, the photo-imaging cylinder 102 of the system 100 is rotated as illustrated in FIG. 1 such that a clean portion of the cylinder 102 passes under the latent image forming unit 104 and a uniform static charge is applied to the photo-imaging cylinder 102. As the photo-imaging cylinder 102 continues to rotate, it passes under a laser imaging portion of the latent image forming unit 104, which dissipates the static charge in selected portions of the cylinder 102, leaving an electrostatic charge pattern that represents the image to be printed. Ink is then transferred onto the photo-imaging cylinder 102 by the BID units 106, a dedicated BID unit being provided for each colour of ink that is to be used. During printing, an engaged BID unit presents a uniform layer of ink to the photo-imaging cylinder 102. The ink from the BID units contains electrically charged pigment particles which are repelled from the areas of the photo-imaging cylinder 102 still containing static charge and are attracted to the discharged areas, thus forming a deposited ink image on the cylinder 102. As the photo-imaging cylinder 102 continues to rotate, it transfers the deposited ink image onto the ITM 108, which then transfers the ink image onto a print medium 114. The print medium 114 is passed over the feed tray 112 and wrapped around the impression cylinder 110 to contact the ITM 108. For a colour image, the print medium is retained on the impression cylinder, making multiple contacts with the ITM 108 and receiving a different layer of colour with each contact. The impression cylinder is covered by an impression layer 116 to capture excess ink.

The above disclosed LEP system and process may be adapted to perform digital embossing in addition to printing. According this adaptation, print media may be temporarily prevented from feeding into the system 100 and ink images may be repeatedly deposited on the impression layer 116 of the impression cylinder 110. The ink images accumulate and build up to form a three dimensional relief ink image or printed relief pattern which may then serve as an embossing die. The ink images forming the embossing die may be deposited in a process substantially as described above with an electrostatic image being formed on the photo-imaging cylinder, and a corresponding ink image being formed and transferred from the photo-imaging cylinder to the ITM and finally to the impression layer of the impression cylinder, where the image may be cured, depending upon the particular process employed. Repeated passes may be made to gradually build up the three dimensional ink structure desired to form the embossing die. Once the die is formed, print media to be embossed may be passed over the die and deformed to correspond to the embossing die by pressure exerted by the ITM.

Figure 2A:
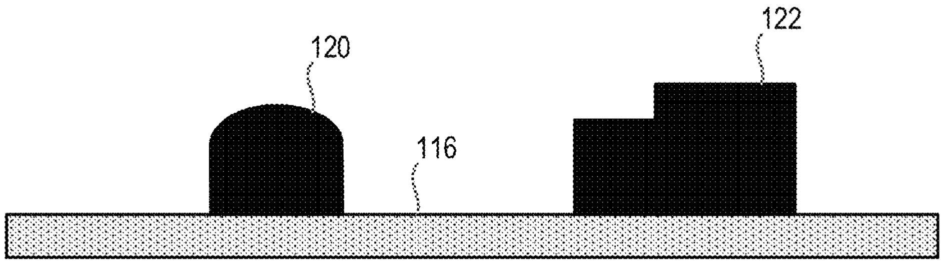
FIGS. 2A to 2C are cross sectional views illustrating an embossing process using printed embossing dies.

FIG. 2A illustrates cross sectional views of example embossing dies 120, 122 formed from deposited ink layers as described above. As discussed, the embossing dies 120, 122 are formed from accumulated layers of ink deposited on the impression layer 116 of the impression cylinder 110. Each ink layer may be of a thickness of about 0.5 microns to about 1 micron, and the embossing die structures 120, 122 may in certain examples be formed from hundreds of layers, each of which may be individually shaped to create the desired ink structure. The digital nature of the process allows for each layer to be differently shaped from preceding layers, thus allowing the formation of complex three dimensional relief features.

The ink used to form the structures 120, 122 may be any colour or may have no colour at all. The ink may be selected so that its mechanical properties facilitate the formation of a printed relief pattern. For example, the ink may be selected for its adhesive or structural characteristics. In some examples, different inks may be used in different layers of the structures. For example, an adhesive ink may be used as a first layer to securely bind the structures to the impression layer 116. The other layers may be built using inks which have more structural properties and are designed to withstand repeated compression during the embossing process. A top layer may be selected so that it does not stick to the media that is being embossed.

Figure 2B:
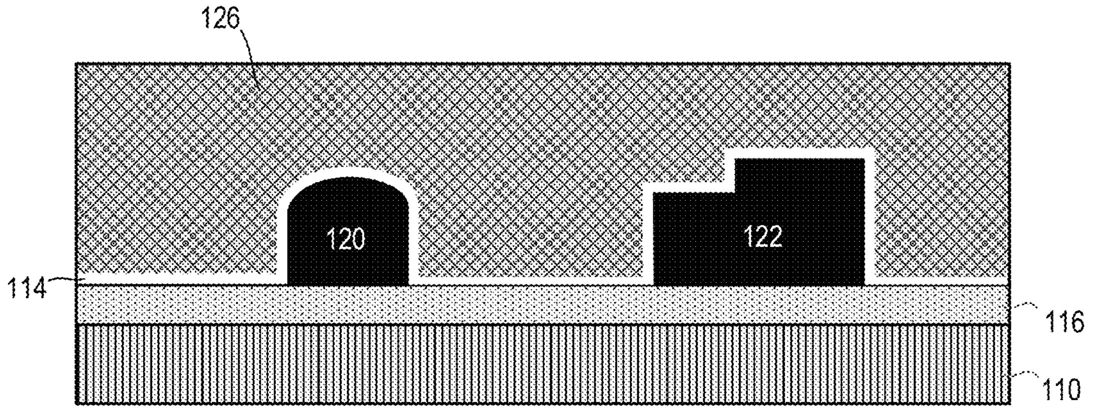
Figure 2C:

FIG. 2B illustrates a print medium 114 that has been compressed against the embossing dies 120, 122 by a resilient layer 126. The resilient layer may for example be a blanket layer formed around the ITM 108. In the nip 130 where the surfaces of the ITM 108 and impression cylinder 110 are in closest proximity, the resilient layer 126 can exert a predetermined amount of pressure on the print medium 114 and force the medium 114 over and into the ink structures 120, 122. This creates an embossed image on the medium 114 that corresponds to the underlying embossing dies. FIG. 2C shows a portion of the medium 114 with an embossed image that corresponds to the embossing die structures 120, 122.

In one aspect of the present disclosure, there is provided a computer program product for carrying out a method of calibrating a thickness of an embossing die which comprises a plurality of ink layers printed by an apparatus. In some examples, the method may comprise calculating an average thickness of an ink layer printed by the apparatus, and calculating a target die thickness as a function of the average ink layer thickness.

In another aspect of the present disclosure, there is provided a system for implementing a method of calibrating a thickness of an embossing die comprising a plurality of ink layers. In some examples, the method may comprise printing a plurality of test dies having a predetermined number of layers, measuring a thickness of the test dies, calculating an average thickness of the test dies, calculating an average ink layer thickness from the average die thickness and the predetermined number of ink layers, and using the average thickness to determine the number of ink layers necessary to print a die of a target thickness.

In a further aspect of the present disclosure, there is provided a method of measuring a thickness of an embossing the which is supported on a first surface and used in cooperation with a second, substantially resilient, surface which is operable to press print media against the die. In some examples, the method may comprise calibrating a relation between indentation of the first surface into the resilient surface and applied force causing the indentation, forming an embossing die on the first surface, forcing the resilient surface against the first surface, calculating a change in applied force occasioned by the presence of the embossing die, and calculating the thickness of the embossing die from the calculated change in force and the force-indentation calibration.

The present inventors have found that accuracy of embossing can be considerably enhanced by calibration of the thickness of a die formed by a plurality of ink layers. By calculating an average thickness of an ink layer, and subsequently calculating a target die thickness as a function of the average ink layer thickness, the computer program product of the present disclosure permits accurate and repeatable printing of embossing dies. Regular ink calibration may be conducted as part of a normal printing process. However, such calibration, being an integral part of print quality control, is concerned with ink optical density, this being one of the main concerns for print quality. Thus the physical thickness of the ink layer deposited is not considered in a standard ink calibration process. The present inventors have noted that production tolerances and the effects of repeated print runs can therefore create variation in the thickness of ink layers between presses and over time within the same press. Owing to these variations, a predetermined decision on how many layers are to be used to produce an embossing die of a specified thickness may lead to inconsistency between embossing presses and over time within a single press. The computer program product disclosed above may address this issue by accounting for variations in deposited ink layer thickness between apparatus and over time. The computer program product of the present disclosure thus allows for accurate determination and correction of embossing die thickness before the die in question has been created, enhancing efficiency of the overall process.

In some examples, calculating an average thickness of an ink layer may comprise obtaining an average thickness of a plurality of test dies which may be printed by the apparatus, and dividing the average thickness of the plurality of test dies by the number of ink layers constituting the test dies.

In some examples, obtaining an average thickness of the plurality of test dies may comprise causing a plurality of test dies to be printed, measuring a thickness of the test dies and taking an average over the measured thicknesses.

In some examples, measuring a thickness of the test dies may comprise calibrating a relation between indentation of a die carrying surface into a resilient surface and applied force causing the indentation, causing a test die to be printed, calculating a change in applied force occasioned by the presence of the test die and calculating the thickness of the test die from the calculated change in force and the force-indentation calibration.

In some examples, after calculating a target die thickness as a function of the average ink layer thickness, the method carried out by the computer program product may further comprise forming an embossing die by depositing multiple layers of ink on an impression layer to form a printed relief pattern, and pressing media against the embossing die to transfer contours of the printed relief pattern to the media.

In some examples, the computer program product may be implemented in computing hardware and/or machine readable instructions, for example in the form of software. Non limiting examples of computer hardware may include any computer apparatus that can store, retrieve, process and/or output data and/or communicate with other computers. The results produced may be displayed on a display of the computing hardware. In some examples, machine readable instructions implementing the computer program product of the present disclosure may be recorded on computer-readable media which may comprise computer-readable recording media. In some examples, the computer readable media may be non transitory computer readable media. Non limiting examples of computer-readable recording media may include a magnetic recording apparatus, an optical disk, a magneto-optical disk, and/or a semiconductor memory (for example, RAM, ROM, etc.). Non limiting examples of magnetic recording apparatus include a hard disk device (HDD), a flexible disk (FD), and/or a magnetic tape (MT). Non limiting examples of an optical disk include a Digital Versatile Disc (DVD), a DVD-RAM, a Compact Disc (CD), a CD-ROM and/or a CD-RW. In some examples, a machine readable instructions implementing the product of the present disclosure may also be transmitted over transmission communication media such as carrier wave signals and/or distributed over a network such as a local area network or a global network such as the internet.

In some examples, in a system for implementing a method of calibrating a thickness of an embossing die comprising a plurality of ink layers, the method may comprise printing a plurality of test dies having a predetermined number of layers, measuring a thickness of the test dies, calculating an average thickness of the test dies, calculating an average ink layer thickness from the average die thickness and the predetermined number of ink layers, and using the average thickness to determine the number of ink layers necessary to print a die of a target thickness.

In some examples, the above method may be carried out by the computer program product of the present disclosure.

In some examples, the plurality of test dies may include between 2 and 200 test dies. In some examples, the predetermined number of ink layers in a test die may be between 10 and 500 layers, and may for example be between 50 and 200 layers.

In some examples, the plurality of test dies may be printed in a predetermined location. The predetermined location may for example be at the top or bottom of an impression sheet and in other examples may be towards the left, right or centre of an impression sheet. In some examples, a further plurality of test dies may be printed in a different predetermined location. In some examples, several pluralities of test dies may be printed in several different predetermined locations.

In some examples, the plurality of test dies may be printed having a substantially horizontal orientation. In some examples, the method may further comprise changing a printing condition between printing of each of the plurality of test dies. The printing condition may for example include a separation between printing cylinders. In this manner, the method may account for differing conditions when printing embossing dies. In other examples, the location of the printed test dies may be changed during or after completion of the method.

In some examples, the method may further comprise repeating each of the method steps after a predetermined interval. The method may thus be employed to calibrate thickness of embossing dies on an apparatus after a predetermined interval of time, so adjusting for the effects of repeated print runs. In other examples, the method may further comprise repeating each of the method steps after completion of a predetermined number of print runs. In other examples, the method may be employed across each apparatus that is to be used for an embossing process, thus contributing towards consistency of output across different apparatus units.

In some examples, the method may further comprise forming an embossing die by depositing multiple layers of ink on an impression layer to form a printed relief pattern, and pressing media against the embossing die to transfer contours of the printed relief pattern to the media.

In some examples, a printer or other apparatus may be programmed to carry out the method.

In some examples, a method of measuring a thickness of an embossing die may comprise the steps outlined below. The embossing die may be supported on a first surface and may be used in cooperation with a second, substantially resilient, surface which may be operable to press print media against the die. The method steps may comprise calibrating a relation between indentation of the first surface into the resilient surface and applied force causing the indentation, forming an embossing die on the first surface, forcing the resilient surface against the first surface, calculating a change in applied force occasioned by the presence of the embossing die, and calculating the thickness of the embossing die from the calculated change in force and the force-indentation calibration.

In some examples, the above method may be conducted as a component part of the method of calibrating a thickness of an embossing die disclosed above. In these or other examples, the above method may be carried out by the computer program product of the present disclosure.

In some examples, the calibrating step of the above method may comprise measuring current flow to a motor engaging the first surface against the resilient surface at different values of indentation.

In some examples, the calibrating step may further comprise converting measured values of current to values of force using a predetermined force-current relationship. The predetermined force-current relationship may for example be supplied in connection with the apparatus employed or may be determined using simple measurement apparatus.

In some examples, calculating a change in applied force may comprise measuring current flow to a motor engaging the first surface against the resilient surface. In some examples, calculating a change in applied force may further comprise converting measured current values to force values using a predetermined force-current relationship and calculating a change in force occasioned by the presence of the embossing die. In some examples, calculating the change in applied force may further comprise plotting values of current and or force against position and determining the change occasioned by the presence of the embossing die by reading the relevant change at the location of the embossing die.

In some examples, a printer may be programmed to carry out the method.

The following examples illustrate a number of variations of the computer program product, system, method and related aspects. However, it is to be understood that the following are only illustrative of the application of the principles of the computer program product, system, method and related aspects. Numerous modifications and alternatives may be devised without departing from the spirit and scope of the computer program product, system, method and related aspects. The appended claims are intended to cover such modifications and arrangements. Thus, while the computer program product, system, method and related aspects have been described above, the following description provides further examples of what are presently deemed to be acceptable manners in which the computer program product, system, method and related aspects may be realised.

The following explanation of the computer program product, system, method and related aspects is provided with reference to the LEP printing system 100 described above. However, such reference is for the purpose of example only, and is not intended to limit in any way the scope of the present disclosure. The disclosed computer program product, system, method and related aspects may be employed in connection with a range of different printing systems and apparatuses.

The LEP printing system 100 may be adapted to implement a method of calibrating and/or a method of measuring as described herein. The LEP printing system 100 may be programmed with a computer program product as described herein.

Figure 3:
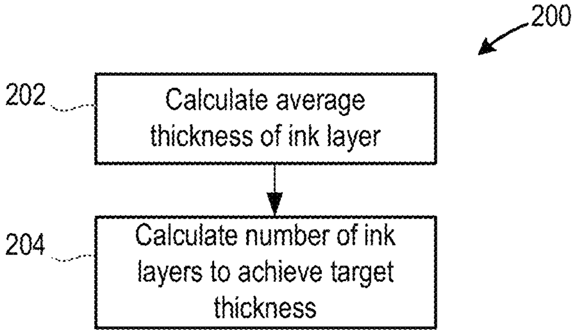
FIG. 3 is a flow diagram outlining processing steps in a method of calibrating a thickness of an embossing die according to an example disclosed herein.

A flow chart illustrating example processing steps conducted by a computer program product as described herein is shown in FIG. 3. The computer program product may implement a method 200 of calibrating a thickness of an embossing die which comprises a plurality of ink layers. In a first step 202, the method may calculate an average thickness of a deposited ink layer. This average layer thickness, once calculated, may allow calculation of a predetermined target thickness for the embossing die as a function of the average layer thickness, and thus calculation, in step 204, of the number of ink layers appropriate to achieve the target thickness by dividing the target thickness by the average layer thickness.

A plurality of intermediate steps may be conducted in order to achieve the calculation steps 202, 204 illustrated in FIG. 3. These may involve printing of test embossing dies of a predetermined number of ink layers, calculation of average thickness of the test dies and hence calculation of an average ink layer thickness. In order to support calculation of thicknesses of printed test embossing dies, an initial calibration process may be conducted to establish what will be termed in the present specification a force-indentation relation, as discussed below.

Figure 4:
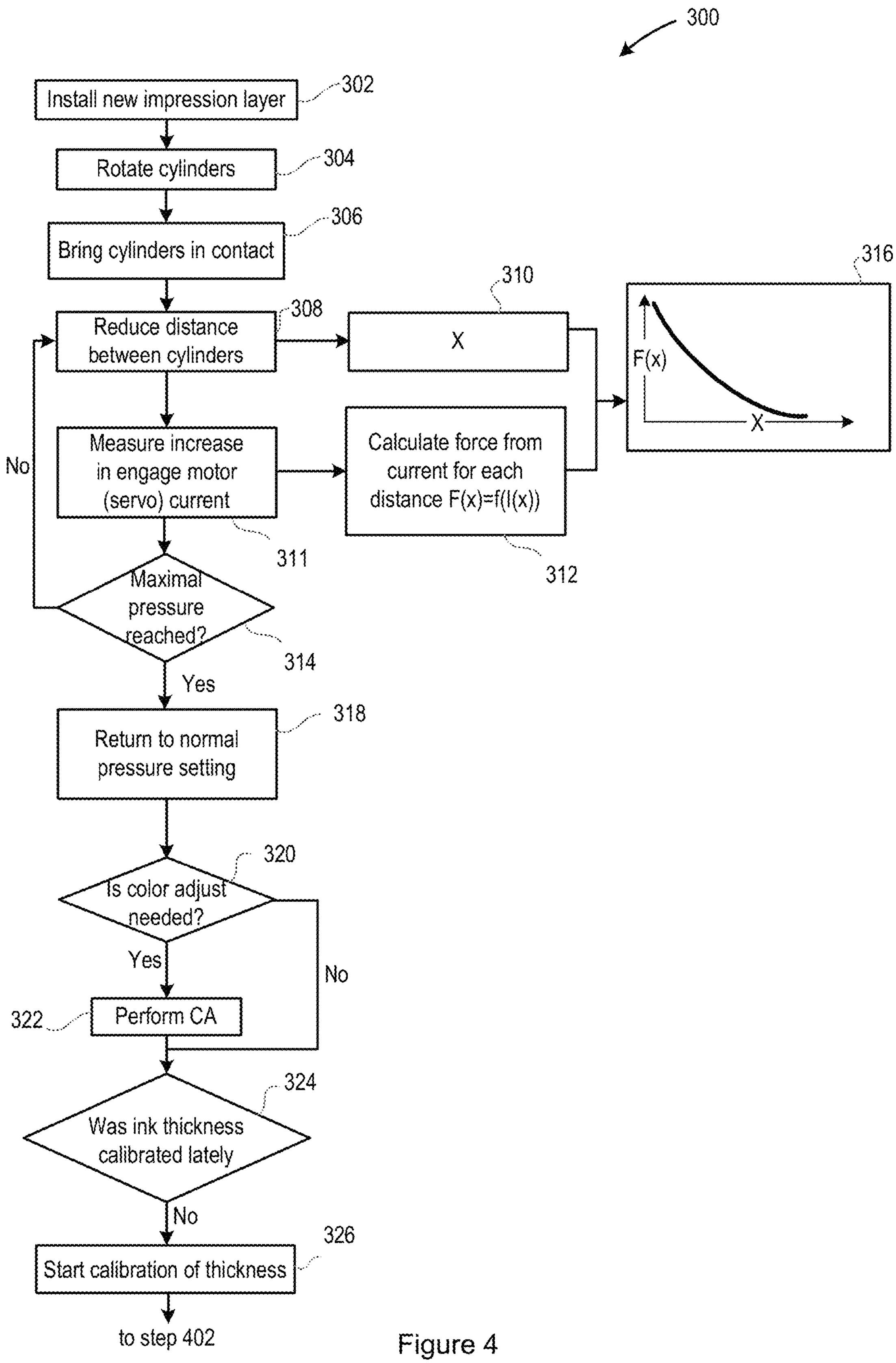
FIG. 4 is a flow diagram outlining processing steps in a method of calibrating a force-indentation relation according to an example disclosed herein.

During the digital embossing process described above with reference to LEP system 100, a motor may be employed to bring the ITM 108, with its enveloping resilient blanket 126, into engagement with the impression cylinder 110, and its surrounding impression layer 116. The impression layer 116 provides the substantially rigid and unyielding surface on which the embossing dies may be printed, with the resilient blanket 126 forcing deformation of the print media over the embossing dies to create the embossed image. Owing to the resilient nature of the blanket 126, the distance between the centres of rotation of the ITM 108 and the impression cylinder 110 may be reduced, even when the surfaces of the encircling blanket 126 and impression layer 116 have been brought into contact. Such reduction in the distance between the centres of rotation of the two cylindrical elements results in indentation of the relatively rigid impression layer 116 into the resilient blanket 126. The engagement force F applied to the cylinders may be directly calibrated with the distance by which the surface of the impression layer has penetrated into the blanket 126. An example of such a calibration process is illustrated in FIG. 4 and described below.

According to the example process 300, in a first step 302, a new impression layer 116 is installed around the impression cylinder 110. Then, in step 304, the impression cylinder 110 and ITM cylinder 108 are caused to rotate and, in step 306, the surfaces of the layers 116 and 126 encircling the cylinders are brought into contact. Following this, the distance x between the centres of the two cylinders is reduced at step 308, causing the impression layer 116 to penetrate into the blanket 126. The distance by which the impression layer 116 has penetrated into the blanket 126 is equivalent to the reduction in distance x between the centres of the two cylinders. The new value of x is recorded at step 310. The increase in motor current required to generate the reduced separation distance x is measured in step 311 and then, in step 312, the applied engagement force corresponding to the measured increase in current is calculated from a predetermined relation between applied current I and engagement force F. This predetermined relation between current and engagement force may be provided in connection with the apparatus, or may be calculated by varying the applied current and measuring the corresponding engagement force at a range of current values.

Once the engagement force F has been calculated, an assessment is made in step 314 as to whether maximum engagement pressure has been reached. If maximum pressure has not been reached, the method returns to step 308 and follows steps 308 to 312 again, reducing the distance between the cylinders, recording the new reduced value of x, measuring the associated increase in current I and calculating the applied force F. The method continues to cycle through steps 308 to 312 with reducing x until the assessment is made at step 314 that the maximum engagement pressure has been reached. As each pair of values for x and F is generated, they may be stored to build a body of reference data which may be interpolated to provide the desired correlation between applied force and blanket penetration, as represented by separation distance between the cylinders. For the purpose of visualisation, the values of F and x may be plotted on a graph 316 of F(x) against x, thus providing a visual representation of the correlation.

Once maximum pressure has been reached ("yes" at step 314), the cylinders are returned to a normal pressure setting at step 318 and an assessment is made at step 320 as to whether or not a colour adjustment is appropriate. If colour adjust is appropriate, this is performed at step 322, after which the method continues to step 324. If colour adjust is not appropriate, the method proceeds directly to step 324, where a further assessment is conducted as to whether an ink thickness calibration is appropriate. According to the illustrated example, this involves assessing whether an ink thickness calibration has been conducted within a predetermined period of time. If an ink thickness calibration has not been conducted in this period of time, the method proceeds at step 326 to the thickness calibration, an example of which is described below and illustrated in FIG. 5. The predetermined period of time may be selected according to the particular apparatus concerned and the processes being conducted. The period of time may be measured in hours, days or in number of print runs. According to other examples, additional conditions may be imposed at step 324 including for example a direction to conduct a thickness calibration after a period of non use, before commencement of each new embossing run or after resupply of a binary ink developer unit or replacement of any part of the apparatus. Other factors which may influence a validity of a previous calibration may also be imposed as conditions at step 324, including for example blanket history, the particular substrate used and other process parameters or changes in ink values or properties.

Figure 5:
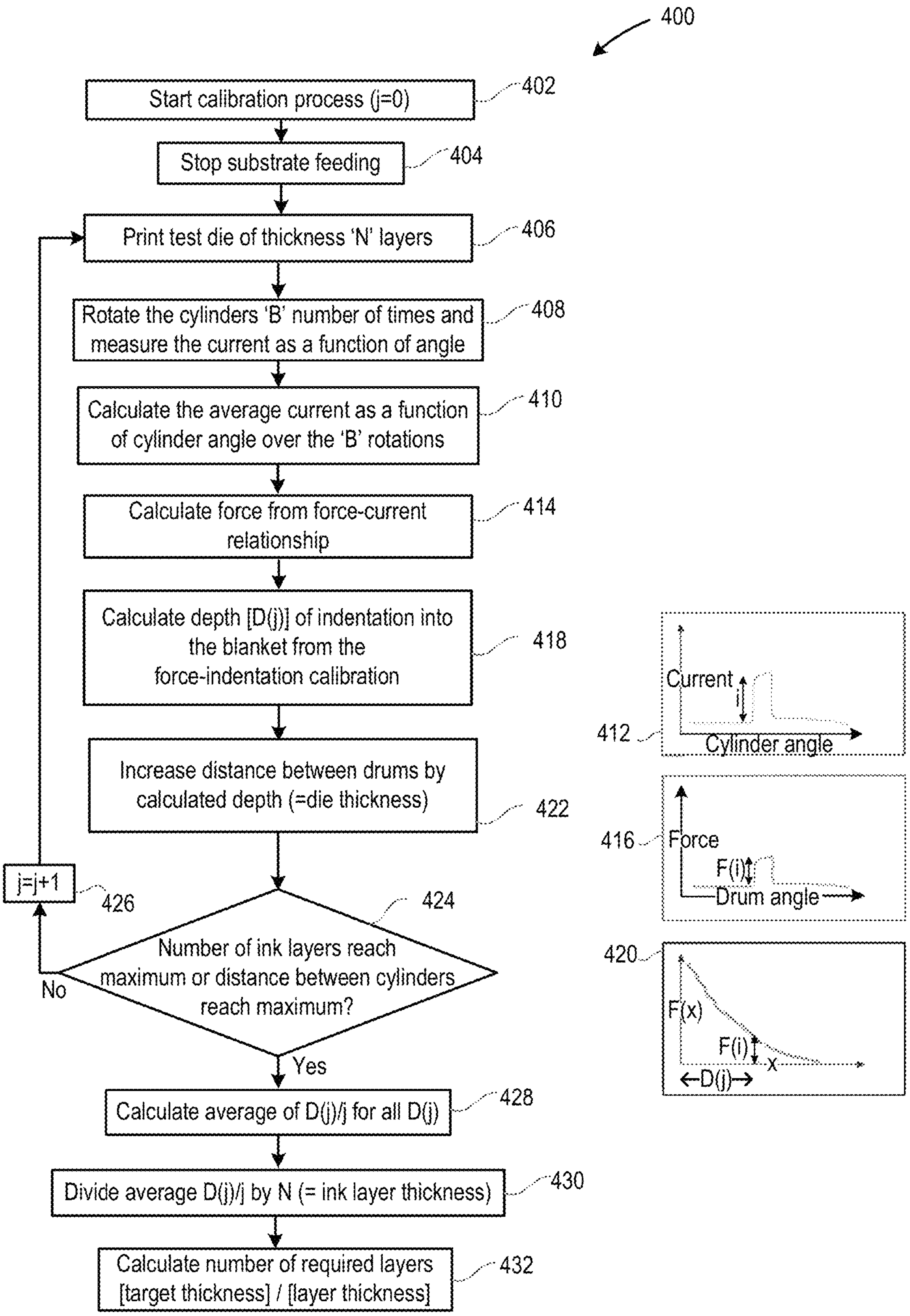
FIG. 5 is a further flow diagram outlining processing steps in a method of calibrating a thickness of an embossing die according to an example disclosed herein.

FIG. 5 illustrates an example of a thickness calibration method according to the present disclosure. According to the illustrated example 400, in a first step 402, the calibration begins and an iteration counter j is set to zero. Next, at step 404, the print media or other print substrate is stopped from entering the system and wrapping around the impression cylinder. At step 406, a test embossing die having a thickness of N layers is printed directly onto the blank impression layer 116. This test embossing die may for example be a horizontally oriented strip or may be any other suitable shape. In one example, the test die is printed at a region of the impression layer near to either the top or the bottom of the impression layer 116, or the print format for the system 100. The number of layers N forming the test die may be selected to ensure adequate thickness for measuring while also allowing suitable margin for reprinting a further die over the original, as discussed below. According to various examples, N may be within the range of about 10 to about 500.

With the printed test die in place, the ITM and impression cylinders 108, 110 are rotated number of times B at step 408, and the current applied to the engagement motor is measured as a function of the angle of rotation of the cylinders. The number B of rotations may be selected according to desired test conditions and may for example be between about 3 and about 50. Then, at step 410, the average current as a function of cylinder angle is calculated over the B rotations. This average current as a function of rotation angle may be recorded for interpolation, and for the purposes of visualisation may be plotted on a graph 412. As illustrated in FIG. 5, the graph 412 illustrates the increase in current associated with the rotation angles over which the test embossing die is present. This increase in current represents the increase in force to maintain the cylinders at the established separation as the test embossing die penetrates into the resilient blanket 126.

Once the average current as a function of cylinder angle has been calculated, the engagement force is calculated, in step 414, as a function of the cylinder angle. This calculation is conducted using the previously discussed relation between the engagement force and the applied current to the motor which supplies that force. The calculated force as a function of cylinder angle may be recorded and for the purposes of visualisation may be plotted in a graph 416. As illustrated in FIG. 5, the change in force corresponding to the presence of the test embossing die can be clearly seen on the graph. This change in force F(i) is the difference between the base line force applied over the majority of the rotation, and the peak force seen at the angular values corresponding to the location of the test embossing die. At step 418, the method employs the force-indentation calibration established according to the example steps illustrated in FIG. 4 and discussed above to calculate the separation distance x, and hence the penetration into the blanket corresponding to the value of the increase in force measured at the location of the test embossing die. This force-indentation calibration allows the increased indentation at the location of the test embossing die, and hence the thickness of the test embossing die, to be established. As illustrated on FIG. 5, the change in force F(i) corresponding to the die thickness can be plotted on the force-indentation calibration 420 and the separation distance, can be read from the x axis of the graph. Knowing the actual separation distance between the centres of the two cylinders, the thickness of the embossing die D(j) can be extracted as the difference between the actual separation distance and the value of x corresponding to the measured change in force. As discussed above, the graph of F(x) against (x) may be provided simply as a visual representation. Thus, the value of D(j) may be extracted mathematically, for example by creating a fit function for the data points solving for x, or by extrapolating and using a look up table generated from the force-indentation calibration. Alternative mathematical method for extracting and or calculating the value of D(j) corresponding the measured change in force F(j) may also be contemplated.

Following this calculation, the distance between the two cylinders 108, 110 is increased by the calculated thickness of the embossing die D(j) at step 422. An assessment is then made, at step 424, as to whether either a maximum number of ink layers has been reached or a maximum separation between cylinders has been reached. If neither of these conditions has been reached, the method increases the value of the iteration counter j by 1 at step 426 and returns to step 406. A further test die of N layers is then printed over the previous test die and the method cycles through steps 410 to 422 to calculate the thickness D(j+1) of the new test die. Once D(j+1) is established, the separation between the cylinders is increased again and the assessment regarding maximum number of layers of maximum separation is performed again.

Once either the maximum number of layers or maximum separation has been reached ("yes" at step 424) the method proceeds to step 428 and calculates an average thickness of N layers from all the calculated values of D(j). According to one example, this process may involve calculating D(j)/j for all values of j and then taking an average of the calculated values of D(j)/j. In this manner, due account is taken of the fact that all of the embossing dies have been printed in the same place, meaning D(1) is N layers thick, D(2) is 2N layers thick and D(j) is jN layers thick. This average value is then divided by N at step 430 to give an average ink layer thickness. Finally, at step 432, a target embossing die thickness is divided by the average ink layer thickness to establish the number of ink layers to achieve the target embossing die thickness. In another example, the average ink layer thickness may be calculated by finding a fit of D(j) against N*j and calculating a gradient, which will be the thickness of a single layer.

In another example, the method may return to step 406 and repeat the method steps, printing a further plurality of test embossing dies in a different location to the first plurality of test embossing dies. The method may be repeated any desired number of times, calibrating an average layer thickness of test embossing dies printed in a variety of locations on the impression layer 116, or the print format for the system 100. Each repeat of the method steps may result in an average ink layer thickness for the particular location in which the plurality of test embossing dies were printed. In some examples, an average may be taken of these results, providing an average value that is representative of a range of locations across the print format.

While the computer program product, system, method and related aspects have been described with reference to certain examples, various modifications, changes, omissions, and substitutions can be made without departing from the spirit of the present disclosure. It is intended, therefore, that the computer program product, system, method and related aspects he limited only by the scope of the following claims and their equivalents. The features of any dependent claim may be combined with the features of any of the independent claims or other dependent claims.

What is claimed is:

1. An apparatus comprising:

a photo-imaging cylinder;

a latent image forming unit to form a static charge on the photo-imaging cylinder;

a plurality of binary ink developer (BID) units to transfer ink onto the photo-imaging cylinder;

an intermediate transfer member (ITM) to receive ink from the photo-imaging cylinder;

an impression cylinder to cause a print medium to contact the ITM; and a non-transitory computer-readable medium with instructions thereon, the instructions, when executed, cause a processor to:

calculate an average ink layer thickness of an ink layer accumulated on the impression cylinder from the ITM, and calibrate a calculation of a target die thickness as a function of the calculated average ink layer thickness so that the photo-imaging cylinder, the latent image forming unit, the plurality of BID units, the ITM, and the impression cylinder are calibrated for forming an embossing die with the target die thickness.

2. The apparatus of claim 1, wherein the instructions to calculate the average thickness of the ink layer cause the processor to:

obtain an average thickness of a plurality of test dies printed by the apparatus; and divide the average thickness of the plurality of test dies by a number of ink layers constituting the test dies.

3. The apparatus of claim 2, wherein the instructions to obtain the average thickness of the plurality of test dies cause the processor to:

cause a plurality of test dies to be printed;

measure a thickness of the test dies; and take an average over the measured thicknesses.

4. The apparatus of claim 3, wherein the instructions to measure the thickness of the test dies cause the processor to:

calibrate a relation between indentation of a die carrying surface into a resilient surface and applied force causing the indentation cause a test die to be printed calculate a change in applied force occasioned by the presence of the test die; and calculate the thickness of the test die from the calculated change in force and the force-indentation calibration.

5. The apparatus of claim 1, further comprising instructions that, when executed, cause the processor to control the apparatus to:

print a plurality of test dies having a predetermined number of, layers;

measure a thickness of the test dies;

calculate an average thickness of the test dies;

calculate an average ink layer thickness from the average die thickness and the predetermined number of ink layers; and calibrate the printing device to use the average thickness to determine a number of ink layers necessary to print a die of a target thickness.

6. The apparatus of claim 1, further comprising instructions that, when executed, cause the processor to control the apparatus to:

form the embossing die on the impression cylinder;

force a resilient surface of the ITM against the embossing die on the impression cylinder;

calculate a change in applied force occasioned by presence of the embossing die; and calculate a thickness of the embossing die from the calculated change in force and a force-indentation calibration; and increase a distance between the impression cylinder and the resilient surface of the ITM based on the thickness of the embossing die to prepare for embossing.

7. The apparatus of claim 6, further comprising instructions that, when executed, cause the processor to control the apparatus to use different materials in different layers of the embossing die formed on the impression cylinder.

8. A method of calibrating a printing device to form a thickness of an embossing die comprising a plurality of ink layers, the method comprising:

printing, by an ink depositing unit of the printing device, a plurality of test dies having a predetermined number of ink layers onto an ink receiving unit;

measuring, by a processor of the printing device, a thickness of the test dies on the ink receiving unit;

calculating, by the processor, an average thickness of the test dies;

calculating, by the processor, an average ink layer thickness from the average thickness of the test dies and the predetermined number of ink layers; and calibrating a motor of the printing device to position the ink depositing unit and the ink receiving unit to use the average thickness to determine the number of ink layers to print a die of a target thickness.

9. The method of claim 8, wherein the plurality of test dies is printed in a predetermined location.

10. The method of claim 8, wherein the plurality of test dies is printed having a substantially horizontal orientation.

11. The method of claim 8, further comprising changing a printing condition between printing of each of the plurality of test dies.

12. The method of claim 11, wherein the printing condition includes a separation between printing cylinders.

13. The method of claim 8, further comprising repeating each of the method steps after a predetermined interval.

14. A method of operating an apparatus to form an embossing die for embossing, the method including measuring a thickness of the embossing die which is supported on a first surface and used in cooperation with a second, substantially resilient, surface which is operable to press print media against the die, the method comprising:

calibrating, via a processor of the apparatus, a relation between indentation of the first surface into the resilient surface and applied force causing the indentation;

forming, via an ink depositing unit, an embossing die on the first surface;

forcing the resilient surface against the first surface;

calculating, via the processor, a change in applied force occasioned by the presence of the embossing die;

calculating, via the processor, the thickness of the embossing die from the calculated change in force and the force-indentation calibration; and increasing a distance between the first surface and the resilient surface based on the thickness of the embossing die to prepare for embossing.

15. The method of claim 14, wherein the calibrating step comprises measuring current flow to a motor engaging the first surface against the resilient surface at different values of indentation.

16. The method of claim 15, wherein the calibrating step further comprises converting measured values of current to values of force using a predetermined force-current relationship.

17. The method of claim 14, wherein calculating a change in applied force comprises measuring current flow to a motor engaging the first surface against the resilient surface.

18. The method of claim 17, wherein calculating a change in applied force further comprises converting measured current values to force values using a predetermined force-current relationship and calculating a change in force occasioned by the presence of the embossing die.

19. A non-transitory computer readable medium having a set of instructions stored thereon that, when executed, cause a processor to:

calibrate a relation between indentation of a die carrying surface into a resilient surface and applied force causing the indentation;

cause a test die of a plurality of test dies to be printed;

calculate a change in applied force occasioned by the presence of the test die;

calculate a thickness of the test die from the calculated change in force and the relation calibrated between the indentation and the applied force;

take an average over a plurality of measure thicknesses of the plurality of test dies to obtain an average thickness of the plurality of test dies;

divide the average thickness of the plurality of test dies by a number of ink layers constituting the plurality of test dies to calculate an average ink layer thickness of an ink layer printed; and calibrate a calculation of a target die thickness as a function of the calculated average ink layer thickness so that an apparatus is calibrated for forming an embossing die with the target thickness.

* * * * *